Jan. 27, 1970 Y. M. HILL ET AL 3,492,464

RECORD MEDIUM READING APPARATUS

Filed July 15, 1965

5 Sheets-Sheet 1

INVENTORS.
YATES M. HILL
WALTER H. NIEHOFF II

BY

Ronald J. Clark

ATTORNEY

Jan. 27, 1970 Y. M. HILL ET AL 3,492,464

RECORD MEDIUM READING APPARATUS

Filed July 15, 1965

5 Sheets-Sheet 4

Jan. 27, 1970 Y. M. HILL ET AL 3,492,464

RECORD MEDIUM READING APPARATUS

Filed July 15, 1965

5 Sheets-Sheet 5

3,492,464

RECORD MEDIUM READING APPARATUS

Yates M. Hill, Endwell, and Walter H. Niehoff II, Endicott, N.Y., assignors to International Business Machines Corporation, Armonk, N.Y., a corporation of New York Filed July 15, 1965, Ser. No. 472,149

Int. Cl. G06k *7/00;* G01r *31/08, 27/04*

U.S. Cl. 235—61.11 3 Claims

ABSTRACT OF THE DISCLOSURE

An apparatus employing time domain reflectometry for sensing discontinuities in a medium. A transducer is energized with a pulse type wave form. The pulse travels along the transducer. Coaction between the medium and transducer provides reflections from the discontinuities in the medium.

This invention relates to card and tape reading mechanisms and more particularly to an improved card and tape reading means employing time domain reflectometry techniques to sense the presence of data bits.

The eighty column card is well known as an established medium for storing data in punched hole form. Many hole sensing arrangements exist for sensing data stored in a card. One arrangement normally uses brushes which are designed to penetrate the hole and the make contact with a metal plate positioned thereunder. A second arrangement employs photo cells to detect the presence of a light beam passing through the hole. The first arrangement is most reliable at lower speeds while the second arrangement has proved unreliable and is not generally acceptable at this time.

The present invention is intended to provide a rapid means for scanning the punched hole data on a card or tape. More specifically, it is directed first at sensing the presence of holes in a record medium by detecting the electromagnetic (EM) waves reflected from the capacitive discontinuities in those areas of the medium that have holes. Secondly, it is directed at sensing the presence of holes in a record medium by detecting the stress waves reflected from the data bit holes in the path of a mechanical shear wave moving in the zero shear mode through a normally homogeneous medium. Finally, it is directed at the sensing of holes in a record medium by detecting the pressure waves reflected by holes interposed along the boundary wall of the path of a pressure wave moving parallel to the record medium and moving within a closed housing. Hereinafter, the three above enumerated sensing arrangements are referred to as reflection producing means.

It is an object of the present invention to provide a record medium reading apparatus having an increased data reading rate.

It is a further object of the instant invention to provide a record medium reading apparatus which is not mechanically abrasive to the record medium.

It is another object of the instant invention to provide a record medium reading apparatus employing reflection producing means for sensing the data carried by the record medium.

It is still a further object of the instant invention to provide a record medium reading apparatus for reading coded data characters and for decoding the results of the reading operation.

It is a further object of the instant invention to provide a reading apparatus for use with punched cards.

It is another object of the instant invention to provide a record medium reading apparatus for reading coded data characters represented by punched holes on an elongated record medium.

The foregoing and other objects, features and advantages of the invention will be apparent from the following more particular description of preferred embodiments of the invention, as illustrated in the accompanying drawings; wherein—

The same reference numerals are used throughout the several views to represent the same element.

Figure 1:
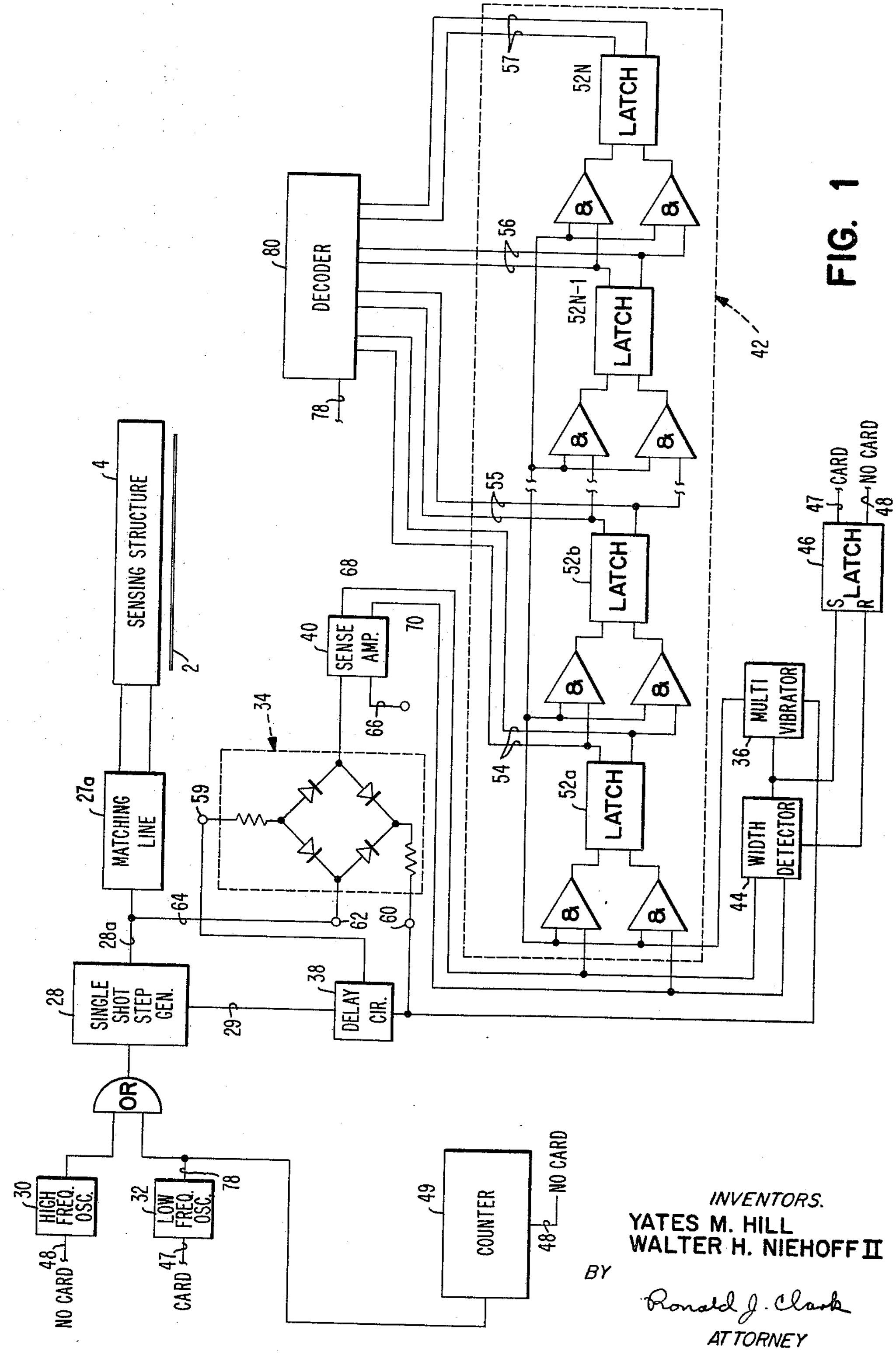
FIG. 1 is a block diagram of the instant invention.

Referring to FIG. 1, a standard record card 2 is shown passing beneath a sensing structure 4. The card 2 can be any standard record card such as the IBM eighty column card containing the well known Hollerith punch coded format. The nine edge of the card is shown at the left end of the card 2 and the twelve edge is shown at the right. In the position shown, a single column of the card 2 is positioned beneath the sensing structure 4.

Figure 2:
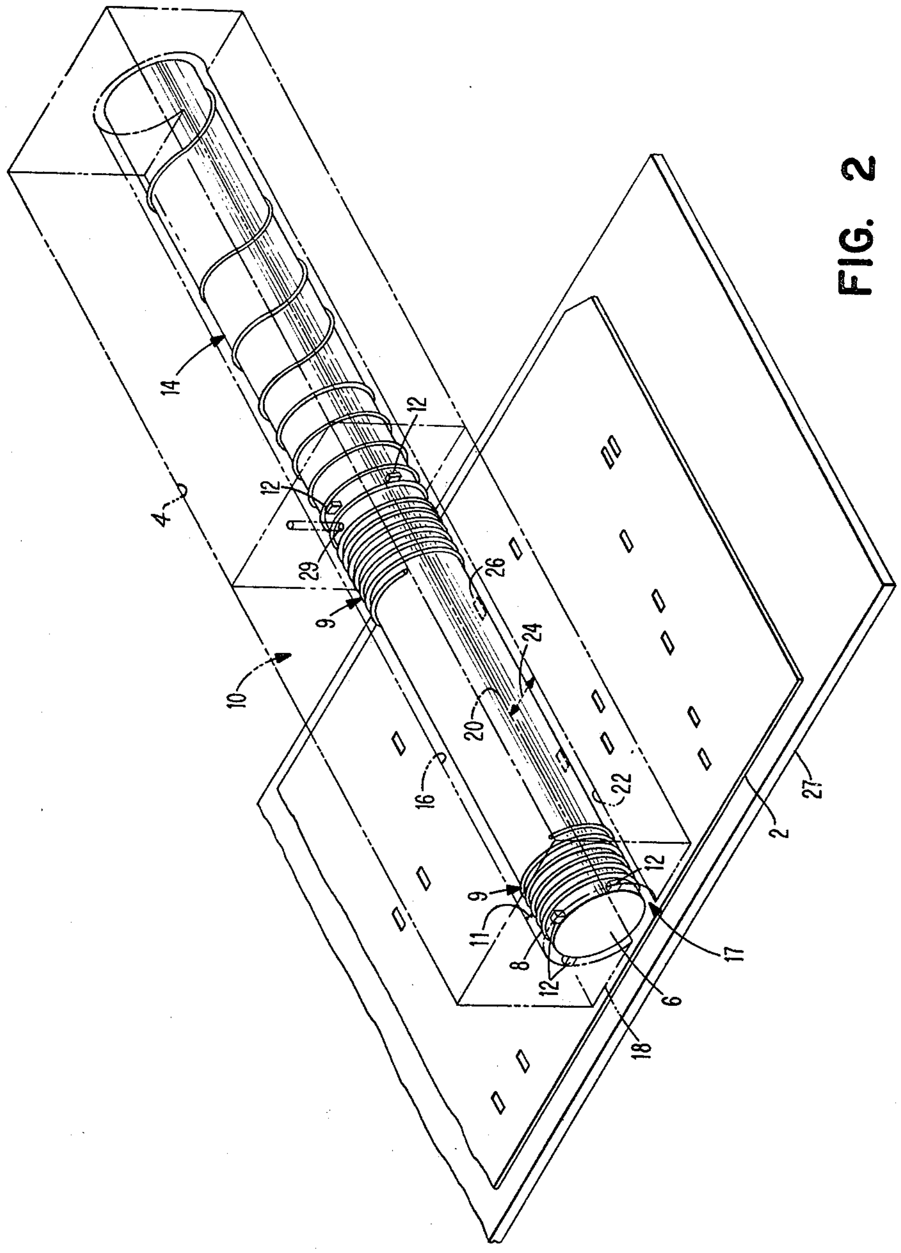
FIG. 2 is a schematic view of the sensing structure employed in the instant invention showing an alternate method for achieving impedance matching.

The placement of the sensing structure 4 in relation to the card 2 is also shown in FIG. 2, wherein the structure 4 is shown in greater detail. The transducer includes a central insulating rod 6 employed to support a wire 8 uniformly wound as a coil 9. The coil 9 comprises approximately two hundred turns per inch of number thirty-eight wire. The coil is uniform as to alignment of adjacent turns and as to its diameter. The rod 6 is employed as a means for keeping the coil 9 to its desired shape. The rod 6 is formed with a uniform diameter of one-quarter inch.

The coil 9 is carried in a housing 10 but uniformly separated therefrom a distance 11 of 6 thousandths of an inch by insulating spacers 12. For example, the housing 10 can be of rectangular cross section. The length of the housing is sufficient to support the sensing coil 9 and an impedance matching coil 14. The housing 10 contains a cavity formed by an inner wall 16 which forms a portion of a cylinder 17. The height of the cylinder is perpendicular to the cross section of the housing. The inner wall 16 intersects a lower wall 18 of the housing 10 along a pair of lines 20 and 22 forming an aperture 24 therebetween. The width of the aperture is sufficient to expose a single column 26 of data on the record card 2. The cylinder 17 receives the rod 6 and the coil 9 wound thereon. A clearance of 6 thousandths of an inch between the coil 9 and the inner wall 16 has been found to be the best. Additionally, the housing 10 is placed 15 thousandths of an inch above a document transport surface 27 supporting the record card 2.

The transmission line formed by this structure should have a characteristic impedance of two thousand ohms when constructed in the manner shown and described. The remaining circuitry shown in FIG. 1 (has an impedance of fifty ohms. Therefore, the sensing structure 4 is connected to an impedance matching device 27*a*. The matching device may be of any well known standard design, such as a tapered line or may be the matching coil 14 shown in FIG. 2. The wire 8 wound on the rod 6 is given a variable pitch on an extension of the rod 6. The pitch is logarithmic in form, presenting a two thousand ohm impedance to the sensing coil 9 and a fifty ohm impedance to a single shot step generator circuit 28. Separating the matching coil 14 and the sensing coil 9 is a discontinuity 29 such as a hole drilled through the cylinder wall 10.

The single shot 28 generates a drive pulse having a rise impedance to the sensing coil 9 and a fity ohm imtime of one nanosecond and a duration of three hundred nanoseconds on a drive line 28*a* and generates an identical gating pulse on separate gating line 29. The use of separate lines prevents loading of the generator 28. Driving the single shot 28 is a pair of oscillators; one of which is a 200 kc. high frequency oscillator 30 and the other of which is a 30 kc. low frequency oscillator 32. The operating rates of the oscillators 30 and 32 are not themselves critical. However, the embodiment shown and described operates to read 2,000 cards per minute and the frequency rates are adjusted for compatibility with this card rate.

The outputs of the single shot 28 are also applied to a gate 34 and a multivibrator 36 via a delay circuit 38. The output of the gate 34 is applied to a sense amplifier 40. The amplifier 40 generates two output signals; one of which represents a "one," a hole exists, and the other of which represents a "zero," no hole. The outputs of the sense amplifier 40 are applied to a shift register 42 and a width detector circuit 44. The output signal from the width detector 44, indicating the presence of a card, turns on the multivibrator 36 and sets a latch 46 to its first stable state wherein it generates a CARD output signal. The CARD output signal turns "on" the low frequency generator 32 by a line 47. The output signal from the width detector 44, indicating the absence of a card, resets the latch 46 to its second stable condition wherein it generates a NO CARD output signal on a line 48. The NO CARD output signal turns on the high frequency oscillator 30 and resets a counting ring 49. The ring 49 comprises eighty separate positions for the embodiment shown in FIG. 1. An outpupt signal is available at each position to identify each column of an eighty column card. For cards having fewer or more columns, a suitable ring 49 could be substituted. Additionally, for record members not employing columns, e.g. punched paper tape, no counter is necessary. In general the function of the counter is to identify the placement of the data on the record member. If no such placement is required, no counter is required.

The shift register 42 comprises a plurality of individual storage elements such as latches 52*a* through 52*n*. The latches are interconnected to accept data from the pair of output terminals of the sense amplifier 40 and to pass the data to successive elements. There are as many individual latch circuits 52 as there are bit positions in the character format employed on the record medium. For example, the Hollerith format employs zero through nine punch positions, en eleven punch position and a twelve punch position for a total of twelve bit positions. Therefore, the shift register 42 would contain an equal number of latch positions 52. The number of latch positions can easily be adjusted for compatibility with the data format. The main function of the shift register is to provide a temporary storage means wherein the character identify indicia is assembled and to provide a buffer wherein the assembled character can be sampled and the contents transferred to a decode network, for example, by pairs of output lines 54 through 57 associated with the latches 52*a* through 52*n* respectively.

The gate 34 comprises a diode network operating as a standard diode bridge. A pair of control signals are applied to the terminals 59 and 60. The signal applied to the terminal 59 is the delayed positive output signal from the delay circuit 38 and the signal applied to the terminal 60 is the delayed inverted output signal from the delay circuit 38. The application of the two control signals gates the signal applied to an input terminal 62 to the sense amplifier 40. The terminal 62 is connected by a line 64 to the junction of the drive line 28*a* of the single shot 28 and the matching circuit 27*a*.

The sense amplifier 40 is a difference amplifier of standard design and is furnished a bias signal on a line 66 to separate the "zero" and the "one" signal responses. The "one" output signal is available at a terminal 68 and the "zero" output signal is available at a terminal 70.

Figure 3:
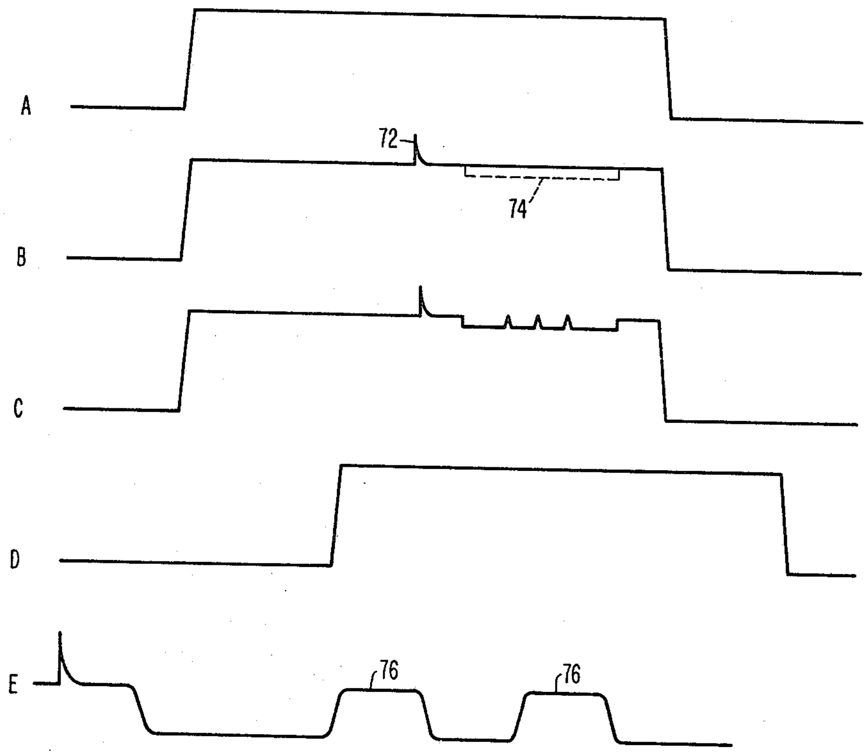
FIG. 3 shows a plurality of waveforms occurring in the embodiment shown in FIG. 1.

The operation of the invention is described with reference to FIGS. 1, 2 and 3. A card is moved past the sensing structure on a card transport 27. The single shot step generator 28 is driven by the high frequency oscillator 30, causing pulses to be sent into the sensing structure 4. The output waveform of the generator 28 is shown in line A, FIG. 3. The delay circuit 38 opens the gate 34 to pass the reflected step generator wave to the sense amplifier 40. With no card beneath the sensing structure, the solid line in line B, FIG. 3, represents the reflected wave received by the sense amplifier 40. The pip 72 is caused by the discontinuity 29 in the sensing structure 4. The pip 72 is used to trigger a biasing waveform generator (not shown), the output of which is applied to the terminal 66 of the sense amplifier 40 compensating for wave attenuation along the sensing structure. The effect of the attenuation is to cause the waveform on line C, FIG. 3, to rise gradually. Therefore a properly rising bias voltage at terminal 66 permits the desired differential amplification to be obtained. When a card begins to pass beneath the structure 4, the waveform on line B changes in the manner now represented by the dotted line 74. The dotted line replaces the solid line which is coextensive thereto. The width detector is responsive to this dotted portion of the reflected wave and signals the presence of a card. The latch 46 is reversed to generate a CARD output signal whereby the low frequency oscillator 32 is turned on and the oscillator 30 is turned off. Additionally, the multivibrator 36 operates to gate any information along the shift register 42. The generator continues to apply the step pulse shown in line A, FIG. 5 to the sensing structure 4. However, with a card passing beneath the structure 4, the generator 28 is driven by the low frequency oscillator 32, which oscillator operates at a frequency which coincides with the rate at which data columns pass beneath the structure 4. More specifically, the output from the low frequency oscillator 32 is synchronous with the columns of data available for reading. The oscillator 32 identifies the column number of a card presently under the sensing structure 4 by advancing the counting ring 49 one position as each column of data passes under the aperture 26.

The sensed data is shown modulating the step pulse on line C and in an expanded form on line E. The reflected pulses 76 in line E are loaded into the shift register in standard fashion by the receiver gate waveform shown on line D. The contents of the shift register 42 are sampled by the output signal from the low frequency oscillator 32 on a line 78. The contents of the shift register are decoded in a decode circuit 80.

In an alternate embodiment the content of the shift register is applied to a translator whereby the Hollerith coded characters are changed a format having fewer or greater bit positions.

Figure 4:
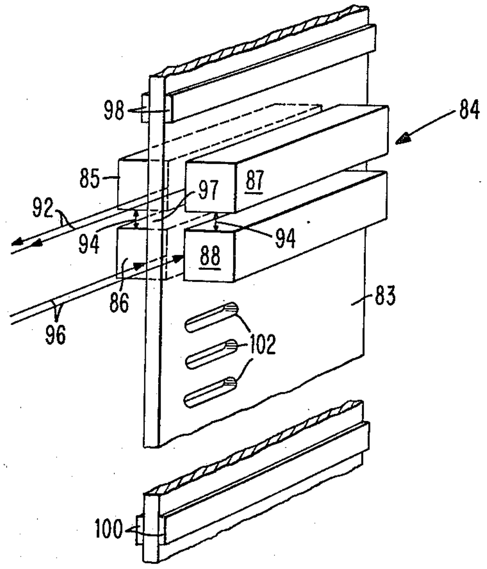
FIG. 4 shows an elongated record member and a transducer for launching and sensing a zero-mode shear wave.

FIG. 4 shows a schematic arrangement for launching and sensing a zero mode shear wave in an elongated record member 83. The launching and sensing unit 84 comprises a plurality of standard piezoceramic shear transducers 85, 86, 87 and 88. Transducers 85 and 87 are placed on opposite sides of the record member 83 and are caused to move in the direction indicated by a pair of arrows 92 in response to an input drive voltage as applied thereto in a standard manner. Transducers 86 and 88 are placed on opposite sides of the record member 83 and are slightly spaced from the transducers 85 and 87, respectively, a distance 94. The transducers 86 and 88 are caused to move in the direction of the arrows 96 in response to an input drive voltage as applied thereto in a standard manner. The back support means for the transducers is not shown but can be of any standard type. The simultaneous movement of the corresponding pairs of transducers generates a zero mode shear stress in an area 97 between the corresponding pairs of transducers. The shear stress propagates through the storage medium 83 and is absorbed by pairs of absorption pads 98 and 100, which pads are placed on opposite sides and in contact with the member 83.

The area of the record medium between the pads 98 and 100 is scanned by the zero shear wave in the following manner. Information holes 102 reflect a small quantity of the shear wave back to the launching and sensing unit 84. These reflected signals are recovered in a manner described with reference to FIGS. 5 and 6.

Figure 5:
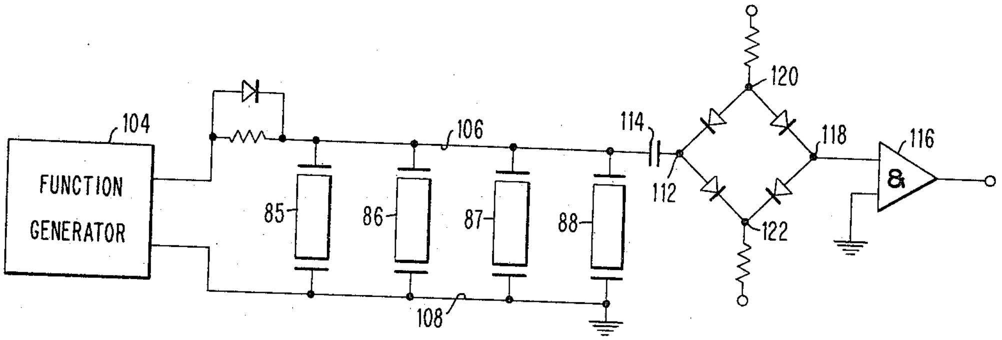
FIG. 5 is a schematic diagram of the arrangement for sending and receiving shear stress signals.

FIG. 5 shows the electrical connection of the electrical transducers 85 through 88 to an input step function generator 104. Each of the transducers is connected across the generator 104 and is connected in parallel with the remaining transducers giving a first common point of connection 106 and a second common point of connection 108. A standard diode bridge circuit 110 is connected to the line 106 by its input terminal 112 and a capacitor 114. The bridge circuit 110 is connected to a sense amplifier circuit 116 by an output terminal 118. The bridge circuit 110 is equipped with a pair of control terminals 120 and 122 to which signals are applied to isolate the sense amplifier 116 during the application of the drive pulse to the transducers 85 through 88 and to which signals are applied to pass return signals to the sense amplifier 116.

Figure 6:
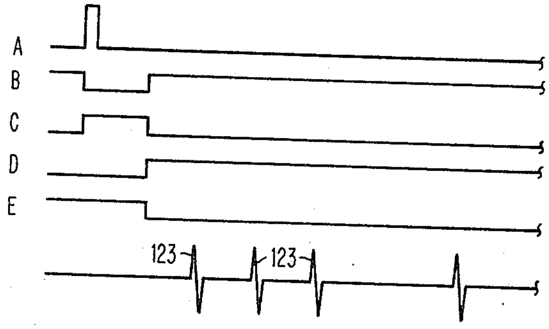
FIG. 6 shows a plurality of waveforms occurring during the scanning of a record medium by a mechanical reflection producing means.

Referring to FIG. 6 there can be seen a plurality of waveforms which occur throughout the arrangement shown in FIG. 5. Line A of FIG. 6 shows the ceramic transducer drive pulse which generates a shear stress in the storage medium 83 shown in FIG. 4. During the application of the drive pulse to the transducers, clamping signals, lines B and C, are applied to the terminals 120 and 122 respectively, isolating the sense amplifier from the drive pulse. When the drive pulse is no longer applied to the transducer, unblanking signals, lines D and E, are applied to the terminals 120 and 122 respectively, passing reflections 123 from the information holes 102, shown in line F, to the sense amplifier 116. A sampling circuit similar to that previously described translates the reflected pulses into character representations.

Figure 7:
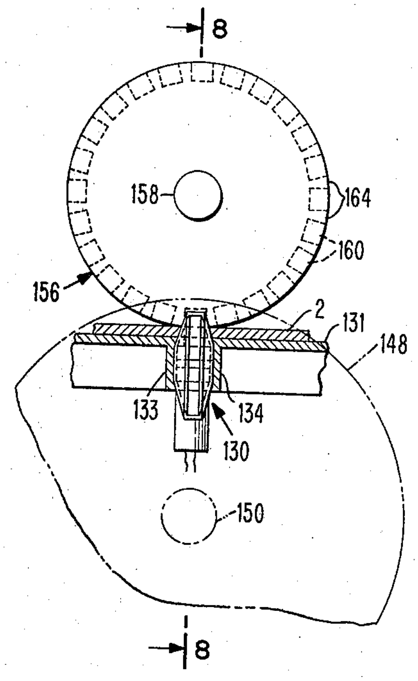
FIG. 7 is an end view of a pneumatic sensing means.
Figure 8:
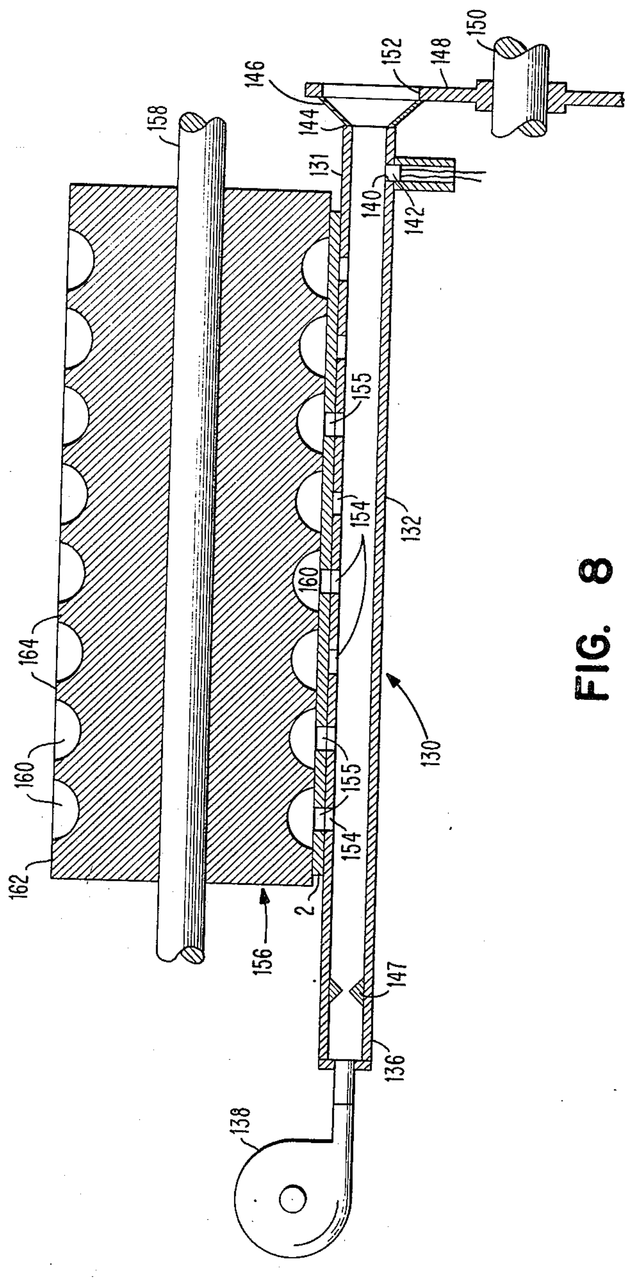
FIG. 8 is a cross sectional view of the pneumatic sensing means shown in FIG. 7, taken on the line 8—8.

FIGS. 7 and 8 show different views of a pneumatic sensing arrangement including a sensing line 130 comprising a top wall 131, a bottom wall 132 and side walls 133 and 134. The line has a rectangular cross section and the inside width of each wall can be one hundred and twenty-five thousandths of an inch. One end 136 of the line 130 is connected to an air pressure source 138 which maintains the air within the line at a constant pressure. The bottom wall 132 is formed with an opening 140 and a probe microphone 142 is placed within the opening and is exposed to the pressure existing within the line 130. The other end 144 of the line 130 terminates in an open ended horn shaped element 146 having a width of forty thousandths of an inch and a height of three hundred and seventy-five thousandths of an inch. A restriction 147 is placed within the line 130 to prevent a sudden drop in air pressure between the source 138 and the restriction 147 when there is a sudden drop in the remaining portion of the line 130.

A chopper disk 148 is placed adjacent and in close proximity to the horn element 146. The disk 148 is attached to a drive shaft 150 which is driven in synchronism with a card transport not shown, and it is formed with a port 152 which matches the opening of the horn 146. The disk 148 rotates at the rate of 12,700 r.p.m. The center of the port 152 is three inches from the center of the shaft 150. The top wall 131 of the line 130 is formed with a plurality of openings 154. There are as many openings 154 as there are possible data holes 155 in the card 2 or record medium which are to be sensed. For this example only eight openings 154 are shown, but this number can be easily expanded to twelve, the number of holes in each column of a standard eighty column card 2.

A cylindrical roller element 156 is driven in synchronism with the card transport by a shaft 158 and is employed to move the cards 2 across the sensing line 130 at a controlled rate. The roller element 156 is formed with a plurality of cavities 160 arranged in rows on an outer wall 162 of the roller element 156. The rows are arranged to lie parallel to each other and parallel to the height of the cylindrical roller 156. Each cavity is separated from its adjacent cavity by a divider wall 164.

The cavities 160 in the roller 156, the holes 155 in the card 2, and the holes 154 in the sensing line 130 are aligned whereby, an air pressure level is built up in those cavities which are ported to the line 130 by the holes 155 in the card 2. The roller element 156 is in close contact with the card 2 preventing the pressure level in an exposed cavity from dissipating prior to its use as hereinafter mentioned.

The operation of the pneumatic sensing arrangement is explained with reference to FIGS. 7, 8 and 9. The card transport mechanism is feeding cards to the sensing arrangement at a constant rate and drives both the roller element 156 and the chopper disk 148. The cards are moving at a rate of 667 per minute, and the chopper disk is rotating at 12,700 revolutions per minute. The air source 138 maintains a relatively high pressure level 168, FIG. 9, while the port 152 in the chopper disk 148 is not exposing the open ended horn element 146. Although the system is not sealed, the relatively high pressure level 168 is constant.

The venting of the line 130 by the port 152 develops a negative pressure wave at the horn end 144 of the line. The negative pressure wave travels to the left past the probe microphone developing a signal which indicates a relatively low pressure level 170. The pressure wave then travels past the possible hole locations. Where a hole exists in the card, the stored pressure behind the hole acts as a short duration source of positive pressure which radiates toward the probe microphone 142 at the instant the wave front moves past. The microphone 142 develops pulses 172 for each hole in the card. Where there is no hole present, the cavity behind the hole does not radiate. These pulses are thereafter decoded in a manner similar to that described with reference to FIG. 1.

Figure 9:
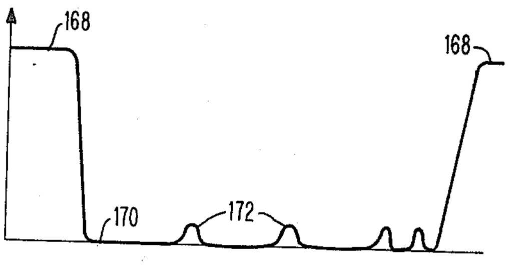
FIG. 9 shows the sensed waveforms in a pneumatic sensing system.

As each column of data holes in a card are scanned, the roller advances to the next column, the disk 148 closes the line 130 and pressure again rises to the level 168, shown in FIG. 9, preparing the sensing arrangement to scan the next column of data holes.

While the invention has been particularly shown and described with reference to preferred embodiments thereof, it will be understood by those skilled in the art that various changes in form and details may be made therein without departing from the spirit and scope of the invention.

What is claimed is:

1. The combination comprising, a record medium containing a plurality of data holes arranged in coded positions, a housing positioned in close proximity to said record medium and having a reading gap formed by a cylindrically shaped cavity, a transmission line, said transmission line positioned within said cavity, a pulse generator for furnishing an electromagnetic waveform to said line, a matching circuit intermediate said generator and said line for achieving impedance matching therebetween, said data holes capacitively modulating said waveform, and means responsive to said modulated waveform for decoding the contents of said record medium.

2. In a record medium reading apparatus, a sensing structure comprising:

a solid housing having a substantially greater length than width, said housing having an outer surface, said housing being formed with a cylindrically shaped inner wall running parallel to said length, said inner wall forming a cavity within said housing, a reading gap being formed by said wall intersecting said outer surface, a coil shaped transmission line within said cavity, means for holding said coil a uniform distance from said wall, and said coil having a uniform pitch in a first region of said gap where the record medium is sensed, said coil having a logarithmic pitch in a second region intermediate said first region and the coupling point.

3. A sensing structure as recited in claim 2 and further including a discontinuity in the housing, said discontinuity being located between said first portion of said coil and said second portion of said coil.

References Cited

UNITED STATES PATENTS

| | | | |
|---|---|---|---|
| 2,787,160 | 4/1957 | Van Valkenburg. | |
| 2,891,190 | 6/1959 | Cohn | 333—34 X |
| 3,144,601 | 8/1964 | Slabodsky | 324—58.5 |
| 3,335,265 | 8/1967 | Apfelbaum et al. | |

OTHER REFERENCES

Lund: "A Broadband Transition from Coaxial Line to Helix," March 1950, RCA Review, pages 133–142.

MAYNARD R. WILBUR, Primary Examiner

T. J. SLOYAN, Assistant Examiner

U.S. Cl. X.R.

324—52, 58.5; 333—31, 98; 336—224; 340—1